United States Patent Office 2,709,167
Patented May 24, 1955

2,709,167
CHROMIUM-CONTAINING MONOAZO DYESTUFFS

Guido Schetty and Werner Kuster, Basel, Switzerland, assignors to J. R. Geigy A. G., Basel, Switzerland, a Swiss firm No Drawing. Application August 24, 1953, Serial No. 376,236

Claims priority, application Switzerland September 10, 1952

5 Claims. (Cl. 260—151)

The present invention concerns the production of chromium containing o.o'-dihydroxyazo dyestuffs which are very well suited for the fast dyeing from a neutral to weakly acid dyebath of wool and, in particular, of synthetic polypeptide fibres similar thereto such as nylon and Perlon.

It is known that complex chromium compounds of metallisable monoazo dyestuffs which do not contain any acid water solubilising groups are very well suited for the fast dyeing of wool and polypeptide fibres similar thereto provided that they are sufficiently water soluble for dyeing purposes. This is then generally only the case when there are certain hydrophilic substituents in the dyestuff molecule. As such for example, are in particular derivatives of hexavalent sulphur, particularly the sulphamide group —$SO_2$—$NH_2$.

It has now been found that also an oxalkoxy substituent in complex chromium compounds of certain o.o'-dihydroxy azo dyestuffs which do not contain any acid water solubilising groups, has a favorable effect on the water solubility and that in addition it improves the levelling power on wool and synthetic polypeptide fibres. New water soluble chromium complex compounds according to the present invention are obtained if dyestuffs not containing any acid water solubilising groups of the general formula:

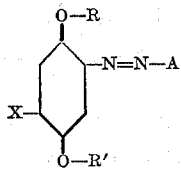

are reacted with agents giving off chromium in such amounts that there are two dyestuff molecules to at least 1 chromium atom. In the above formula:

X represents hydrogen or a non-ionogenic substituent, in particular halogen,

R represents hydrogen or an unsubstituted or substituted alkyl group,

R' represents an oxalkyl radical or a substituent which can be converted into such a radical, and A represents the radical of a 2-hydroxynaphthalene compound coupled in the 1-position which can be further substituted non-ionogenically.

Because of their easy accessibility and the good coupling powers of their diazonium salts, the 2.5-bis-oxalkoxy-1-aminobenzene compounds which if desired can be non-ionogenically substituted in the 4-position, for example by halogen, are particularly suitable as diazo components for the production of the dyestuffs usable according to the present invention. They are easily produced from hydroquinones by oxalkylation of the hydroxyl groups, mononitration and reduction of the nitro to the amino group. If desired, also 4-oxalkoxy-2-amino-1-hydroxy-benzenes can be used provided that the coupling power of their diazonium compounds is sufficient. 5-oxalkoxy-2-alkoxy-1-aminobenzene compounds can also be used. These can be produced from 4-acyloxy-1-hydroxybenzene by mono-nitration with diluted nitric acid, methylation of the hydroxyl group, saponification of the acyloxy group, oxalkylation and reduction of the nitro to the amino group. The use of these compounds is recommended when an alkyloxy radical standing in the o-position to the azo group in the azo dyestuffs usable according to the present invention can only be replaced by the hydroxyl group with difficulty under the conditions of the chroming reaction.

2-hydroxynaphthalene compounds can be used as coupling components capable of coupling in the 1-position. They may be non-ionogenically substituted for example by halogen, alkoxy, sulphonic acid dialkyl amide groups, etc.

The salts of trivalent chromium are suitable as chroming agent, and also if desired complex salts of trivalent chromium such as for example chromic sulphate, chromic formiate, chromic acetate and alkali salts of chromosalicylic acid. The agents giving off chromium are used with advantage in such amounts that there is at least 1 atom of chromium to two dyestuff molecules, whereby an excess is not disadvantageous and is often beneficial. The splitting off of the alkyl radical R which may be present is promoted by metallising at a higher temperature. It is of advantage to perform the metallisation in aqueous solution or suspension at temperatures of over 100° C. under pressure, preferably at 120–160° C. in the presence of wetting and dispersing agents such as Turkey red oil or in alcohol. The chroming can also be performed in an open vessel in higher boiling organic solvents and diluents, e. g. in ethylene glycol, ethylene glycol monomethyl or monoethyl ether, formamide, dialkyl formamide or in the urea melt at 130–155° C.

The new complex chromium compounds are obtained as dark violet powders which dissolve in hot water with a blue and in concentrated sulphuric acid with a violet colour. If necessary, their water solubility can be further improved by mixing with slight amounts of alkaline salts such as sodium carbonate or trisodium phosphate or with anion active wetting and dispersing agents such as soap or synthetic washing agents. They dye wool and in particular synthetic polypeptide fibres similar thereto such as nylon and Perlon from a neutral to weakly acid bath in very fast, clear blue shades and they are distinguished by good levelling power.

The following examples illustrate the invention without limiting it in any way. Where not otherwise stated, the parts are given as parts by weight and the temperatures are in degrees centigrade. The relationship of parts by weight to parts by volume is at that of kilogrammes to litres.

Example 1

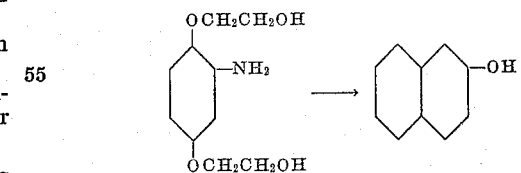

21.3 parts of 1-amino-2.5-bis-oxethoxybenzene are dissolved in 250 parts of water with 35 parts of concentrated hydrochloric acid and diazotised at 0–3°. The diazonium compound is poured at 0–3° into a solution of 15.2 parts of 2-hydroxy naphthalene, 11 parts by volume of 10 N-caustic soda lye and 25 parts of anhydrous soda in 500 parts of water. On completion of the dyestuff formation, the whole is heated to 70°, the dyestuff which precipitates is filtered off and dried. The dyestuff in 800 parts by volume of ethylene glycol with chromic acetate, corresponding to 7.6 parts of $Cr_2O_3$, and 12.8 parts by volume of 10 N-caustic soda lye is then heated for 8 hours at 145–155°. A deep blue-violet solution is obtained which is poured into 2000 parts of 15% sodium chloride solution. After standing overnight, the dyestuff which was at first greasy becomes powdery. It is filtered off, washed with diluted sodium chloride solution and dried. It is a blue-black powder which, after being dispersed with soap powder, dyes nylon from a neutral or weakly acid bath in very light-fast navy blue shades.

A dyestuff with somewhat better drawing power is obtained if 24.8 parts of 4-chloro-1-amino-2.5-bis-oxethoxybenzene is used instead of 1-amino-2.5-bis-oxethoxybenzene.

*Example 2*

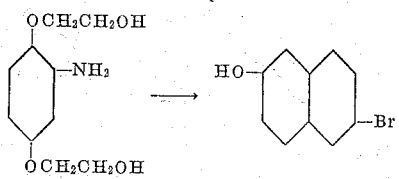

21.3 parts of 1-amino-2.5-bis-oxethoxybenzene are diazotised and coupled with 23.3 parts of 6-bromo-2-hydroxynaphthalene in an analogous manner to that described in Example 1. The isolated and dried dyestuff is chromed with chromic acetate, corresponding to 7.6 parts of $Cr_2O_3$ as in Example 1, isolated and dried. It is a blue-black powder which dyes wool from a neutral bath in reddish navy blue shades.

A dyestuff with very similar properties is obtained if in the above example, 20.8 parts of 6-tert. butyl-2-hydroxynaphthalene or 22.2 parts of 6-tert. amyl-2-hydroxynaphthalene are used instead of 23.3 parts of 6-bromo-2-hydroxynaphthalene.

*Example 3*

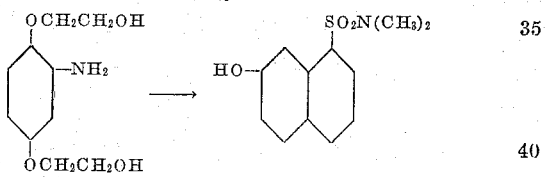

21.3 parts of 1-amino-2.5-bis-oxethoxybenzene are diazotised as in Example 1 and coupled with 26.4 parts of 2-hydroxynaphthalene-8-sulphonic acid dimethylamide. The isolated and dried dyestuff is heated for 12 hours at 150° in 500 parts of glycol with chromic acetate (corresponding to 7.6 parts of $Cr_2O_3$) and 3 parts by volume of 10 N-caustic soda lye. The dark blue solution is poured into 4000 parts of 10% sodium chloride solution. The dyestuff which precipitates is filtered off, washed with diluted sodium chloride solution, dried and mixed finely with 50% of its weight of soap powder. A dark powder is thus obtained which dyes Perlon in dull blue shades which have very good fastness to light.

A dyestuff of a purer and greener shade but with otherwise similar properties is obtained if instead of 2-hydroxynaphthalene-8-sulphonic acid dimethylamide an equal number of parts of 2-hydroxynaphthalene-7-sulphonic acid dimethylamide are used.

A similar dyestuff is also obtained if instead of 21.3 parts of 1-amino-2.5-bis-oxethoxybenzene, 24.8 parts of 4-chloro-1-amino-2.5-oxethoxybenzene are used.

*Example 4*

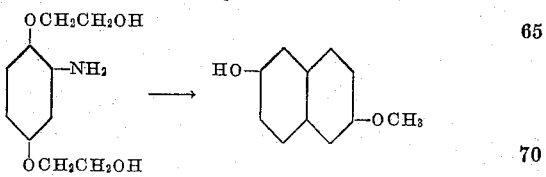

21.3 parts of 1-amino-2.5-bis-oxethoxybenzene are diazotised and coupled with 18.2 parts of 6-methoxy-2-hydroxynaphthalene in a manner analogous to that described in Example 1. The isolated and dried dyestuff is chromed with chromic acetate, corresponding to 7.6 parts of $Cr_2O_3$, as described in Example 1, isolated and dried. It is a dark grey powder which for practical purposes is mixed before use with a dispersing agent. It dissolves in water with a greenish-blue colour and dyes wool from a neutral to weakly acid bath a greenish-blue shade.

A very similar but considerably more reddish dyestuff is obtained if in the above example the coupling component is replaced by 18.2 parts of 7-methoxy-2-hydroxynaphthalene.

What we claim is:

1. The complex chromium compound of a monoazo dyestuff having the general formula:

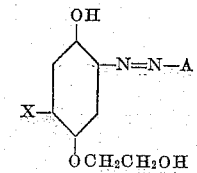

wherein X represents a member selected from the group consisting of hydrogen and chlorine, and A represents a naphtholic coupling component coupled in the 1-position and containing the OH group in 2-position which is otherwise free from carboxylic acid and sulphonic acid groups.

2. The complex chromium compound of a monoazo dyestuff having the formula:

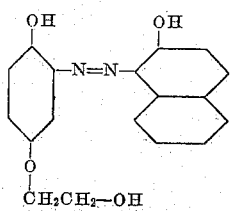

3. The complex chromium compound of a monoazo dyestuff having the formula:

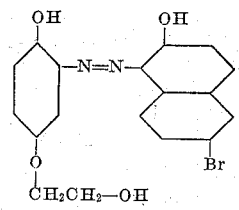

4. The complex chromium compound of a monoazo dyestuff having the formula:

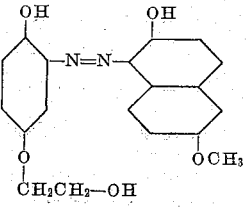

5. The complex chromium compound of a monoazo dyestuff having the formula:

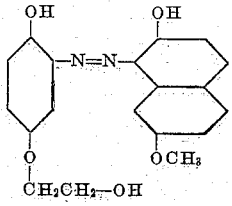

References Cited in the file of this patent

UNITED STATES PATENTS

| | | |
|---|---|---|
| 1,656,233 | Penny | Jan. 17, 1928 |
| 1,770,714 | Spengler et al. | July 15, 1930 |
| 2,224,904 | Elley et al. | Dec. 17, 1940 |